United States Patent
Lee et al.

(10) Patent No.: US 10,750,513 B2
(45) Date of Patent: Aug. 18, 2020

(54) SIGNAL TRANSMISSION METHOD PERFORMED BY TERMINAL IN WIRELESS COMMUNICATION SYSTEM AND TERMINAL USING SAME METHOD

(71) Applicant: LG Electronics Inc., Seoul (KR)

(72) Inventors: Seungmin Lee, Seoul (KR); Kijun Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/098,307

(22) PCT Filed: May 2, 2017

(86) PCT No.: PCT/KR2017/004689
§ 371 (c)(1),
(2) Date: Nov. 1, 2018

(87) PCT Pub. No.: WO2017/192006
PCT Pub. Date: Nov. 9, 2017

(65) Prior Publication Data
US 2019/0150135 A1 May 16, 2019

Related U.S. Application Data

(60) Provisional application No. 62/330,832, filed on May 2, 2016.

(51) Int. Cl.
*H04H 20/71* (2008.01)
*H04W 72/04* (2009.01)
(Continued)

(52) U.S. Cl.
CPC ............. *H04W 72/048* (2013.01); *H04L 5/00* (2013.01); *H04W 4/70* (2018.02); *H04W 72/005* (2013.01);
(Continued)

(58) Field of Classification Search
CPC ............... H04W 72/048; H04W 72/02; H04W 72/0446; H04W 4/70; H04W 88/06; H04L 5/00
(Continued)

(56) References Cited

U.S. PATENT DOCUMENTS

2015/0063214 A1  3/2015 Mishra et al.
2015/0282237 A1* 10/2015 Su ..................... H04W 76/16
                                                            455/552.1
(Continued)

FOREIGN PATENT DOCUMENTS

WO    2015170874    11/2015
WO    2016013826    1/2016

OTHER PUBLICATIONS

Huawei, "SLSS and PSBCH consideration for V2V PC5," 3GPP TSG RAN WG1 Meeting #84bis, dated Apr. 11-15, 2016, 10 pages.
(Continued)

*Primary Examiner* — Thai D Hoang
(74) *Attorney, Agent, or Firm* — Fish & Richardson P.C.

(57) ABSTRACT

Provided are a signal transmission method performed by a terminal in a wireless communication system and a terminal using the method. The method comprises: transmitting a second signal by using a second radio access technology (RAT); and transmitting a first signal by using a first RAT, wherein the first signal includes at least one of a sidelink synchronization signal (SLSS) and a physical sidelink broadcast channel (PSBCH) signal.

9 Claims, 13 Drawing Sheets

(51) Int. Cl.
  *H04W 88/06* (2009.01)
  *H04L 5/00* (2006.01)
  *H04W 4/70* (2018.01)
  *H04W 72/00* (2009.01)
  *H04W 72/02* (2009.01)
  H04W 4/06 (2009.01)
  H04W 4/46 (2018.01)
(52) U.S. Cl.
  CPC ....... *H04W 72/02* (2013.01); *H04W 72/0446* (2013.01); *H04W 88/06* (2013.01); H04W 4/06 (2013.01); H04W 4/46 (2018.02)
(58) Field of Classification Search
  USPC .......................................... 370/312, 335–345
  See application file for complete search history.

(56) References Cited

U.S. PATENT DOCUMENTS

| | | | |
|---|---|---|---|
| 2017/0331577 A1* | 11/2017 | Parkvall | H04L 5/0053 |
| 2019/0045456 A1* | 2/2019 | Seo | H04W 52/243 |
| 2019/0132723 A1* | 5/2019 | Sorrentino | H04W 8/005 |
| 2020/0053835 A1* | 2/2020 | Ye | H04W 72/042 |
| 2020/0076722 A1* | 3/2020 | Kim | H04L 45/16 |

OTHER PUBLICATIONS

Translation of International Search Report in International Application No. PCT/KR2017/004689, dated Jul. 24, 2017, 2 pages.

* cited by examiner

SIGNAL TRANSMISSION METHOD PERFORMED BY TERMINAL IN WIRELESS COMMUNICATION SYSTEM AND TERMINAL USING SAME METHOD

CROSS-REFERENCE TO RELATED APPLICATIONS

This application is a National Stage application under 35 U.S.C. § 371 of International Application No. PCT/KR2017/004689, filed on May 2, 2017, which claims the benefit of U.S. Provisional Application No. 62/330,832, filed on May 2, 2016. The disclosures of the prior applications are incorporated by reference in their entirety.

BACKGROUND OF THE INVENTION

Field of the Invention

The present invention relates wireless communication and, most particularly, to a signal transmission method performed by a user equipment (UE) in a wireless communication system and a UE using the same.

Related Art

The 3rd Generation Partnership Project (3GPP) provides Long-Term Evolution-Advanced (LTE-A), which an enhancement of LTE based on an orthogonal frequency division multiple access (OFDMA)/single carrier-frequency division multiple access (SC-FDMA) transmission mode, as a system standard to meet International Mobile Telecommunication (IMT)-Advanced requirements.

Currently, an LTE-enhanced technology evolving from LTE-A and a new radio access technology (new RAT: NR) for increasing capacity/transmission rate in a high-frequency band to be newly allocated are being developed.

The LTE-enhanced technology refers to an LTE evolution technology that reflects 3GPP specifications (e.g., Release 14/15) given after 3GPP Release 12/13 and can operate in a cellular band used for current mobile communication systems. On the other hand, the new RAT is a new technology developed for a frequency band to be newly allocated. The new RAT may operate in a high-frequency band (e.g., 10 GHz or higher) in order to obtain high capacity, but some functions thereof may be applicable in a low-frequency band. In a fifth-generation (5G) radio access technology, LTE-enhanced and the new RAT may be used by interworking/combination.

For at least a certain period of time in future, an enhanced UE operating by the new RAT and a legacy UE operating by the existing technology will coexist. In this case, when the enhanced UE transmits a signal based on the new RAT, the legacy UE cannot detect/decode the signal, because there are various differences between the existing RAT and the new RAT, for example, in subcarrier spacing, frame structure, reference signal structure, and channel coding scheme.

Accordingly, there is a demand for a method and an apparatus for enabling efficient communication between UEs in an environment where a legacy UE and an enhanced UE coexist. In particular, this demand will further increase in communication where reliability is important, such as vehicle-to-vehicle (V2V) communication.

SUMMARY OF THE INVENTION

An aspect of the present invention is to provide a signal transmission method performed by a user equipment (UE) in a wireless communication system and a UE using the same.

In one aspect, provided is a signal transmission method performed by a user equipment (UE) in a wireless communication system. The method includes transmitting a second signal according to a second radio access technology (RAT) and transmitting a first signal according to a first RAT. The first signal comprises at least one of a sidelink synchronization signal (SLSS) and a physical sidelink broadcast channel (PSBCH) signal.

The first RAT may be an RAT operating in a first frequency band, and the second RAT may be an RAT operating in a second frequency band.

The second frequency band may comprise the first frequency band.

The UE may be a UE mounted in a vehicle, and the second signal may be a vehicle-to-vehicle (V2V) signal transmitted to another UE mounted in another vehicle.

The first RAT and the second RAT may be different from each other in at least one of subcarrier spacing, transmission time interval (TTI), frame structure, used waveform, multiple access scheme, channel coding, and reference signal structure.

The PSBCH signal may comprise information indicating a resource used by the UE for V2V communication.

The method may further comprise receiving, from a network, information indicating whether there is another UE operating by the first RAT on a particular carrier.

The SLSS and the PSBCH signal may be transmitted only when it is determined through the information that there is the other UE on the particular carrier.

A TTI for the first RAT may be twice longer than a TTI for the second RAT.

The SLSS and the PSBCH signal may be signals that are detectable or decodable by a UE supporting only the first RAT.

The UE may be a UE supporting both the first RAT and the second RAT.

In another aspect, provided is a user equipment (UE). The UE includes a radio frequency (RF) unit to transmit or receive a radio signal and a processor coupled with the RF unit to operate. The processor transmits a second signal according to a second radio access technology (RAT) and transmits a first signal according to a first RAT, and the first signal comprises at least one of a sidelink synchronization signal (SLSS) and a physical sidelink broadcast channel (PSBCH) signal.

According to the present invention, for an enhanced UE operating by a new RAT and a legacy UE operating by an existing RAT, it is ensured to mutually detect/decode at least an SLSS and a PSBCH signal. Therefore, a UE can give information on a resource used by the UE to another UE operating by another RAT, thereby preventing a resource collision. As a result, it is possible to reduce interference between the enhanced UE and the legacy UE and to increase the reliability of communication.

DESCRIPTION OF EXEMPLARY EMBODIMENTS

Figure 1:
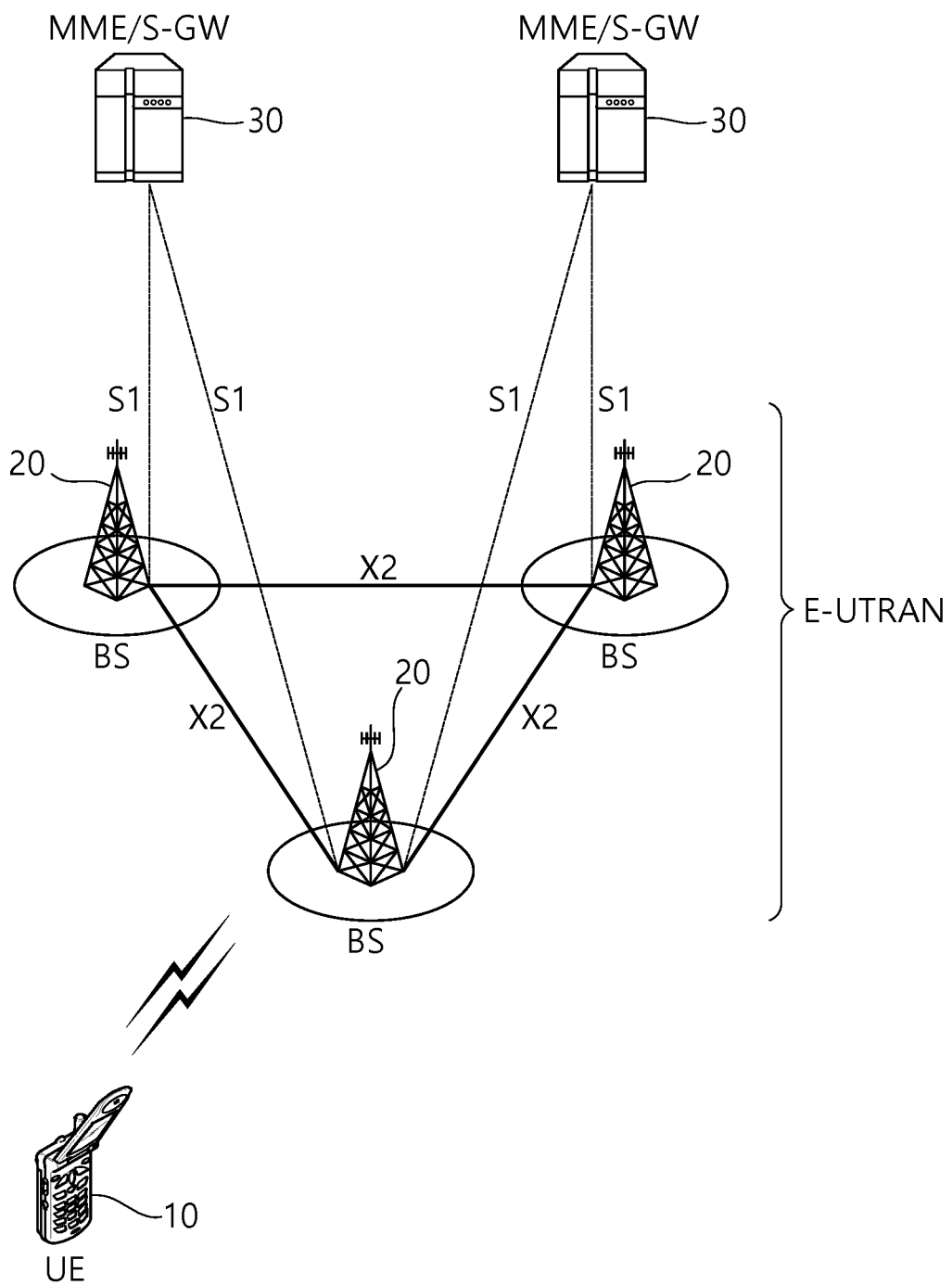
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
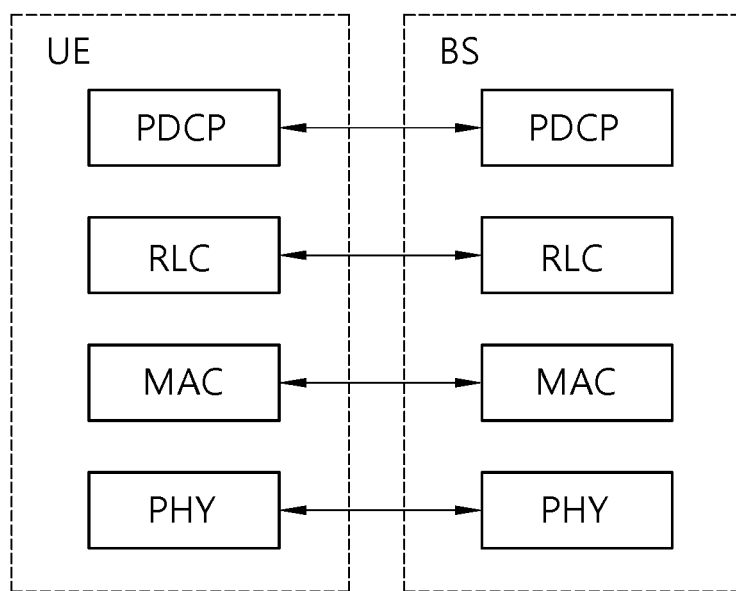
FIG. 2 is a diagram showing a wireless protocol architecture for a user plane.
Figure 3:
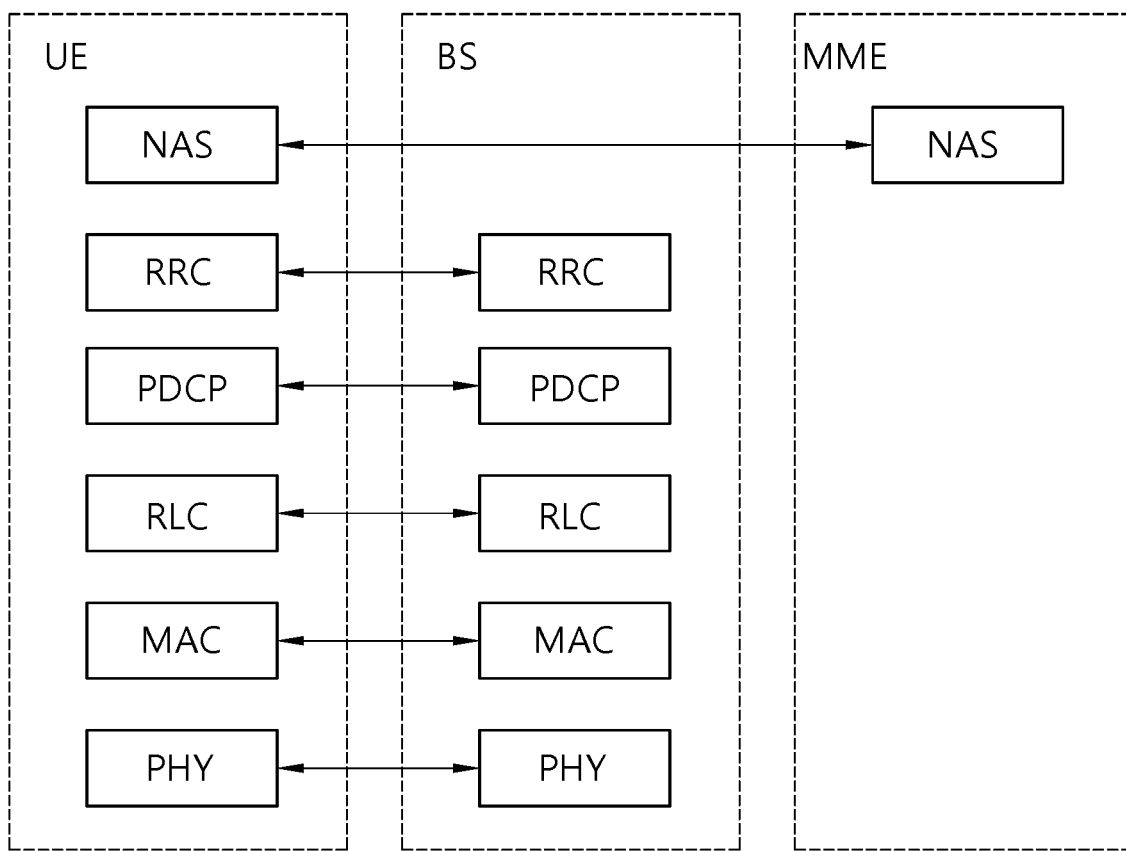
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
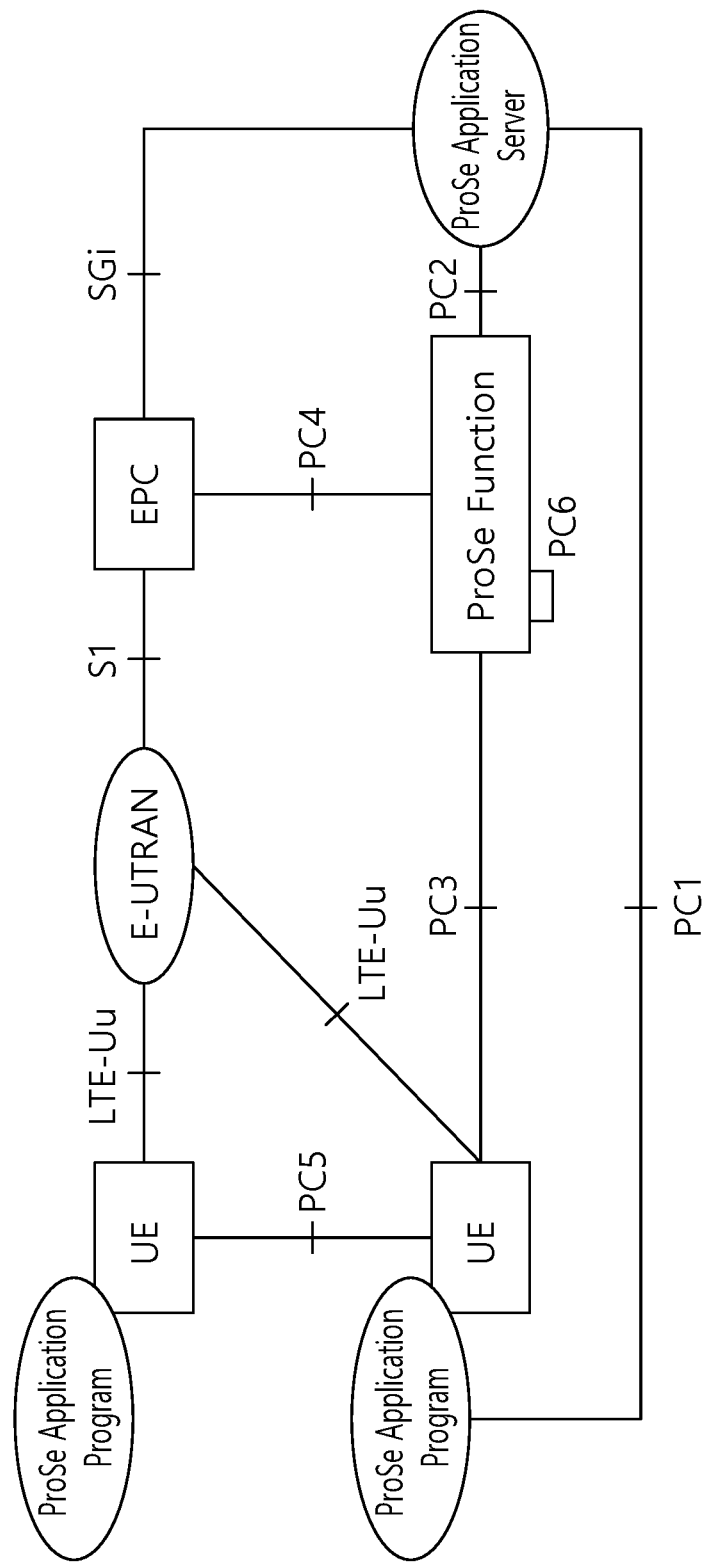
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

The D2D operation may be supported both when UE is serviced within the coverage of a network (cell) or when it is out of coverage of the network.

Figure 5:
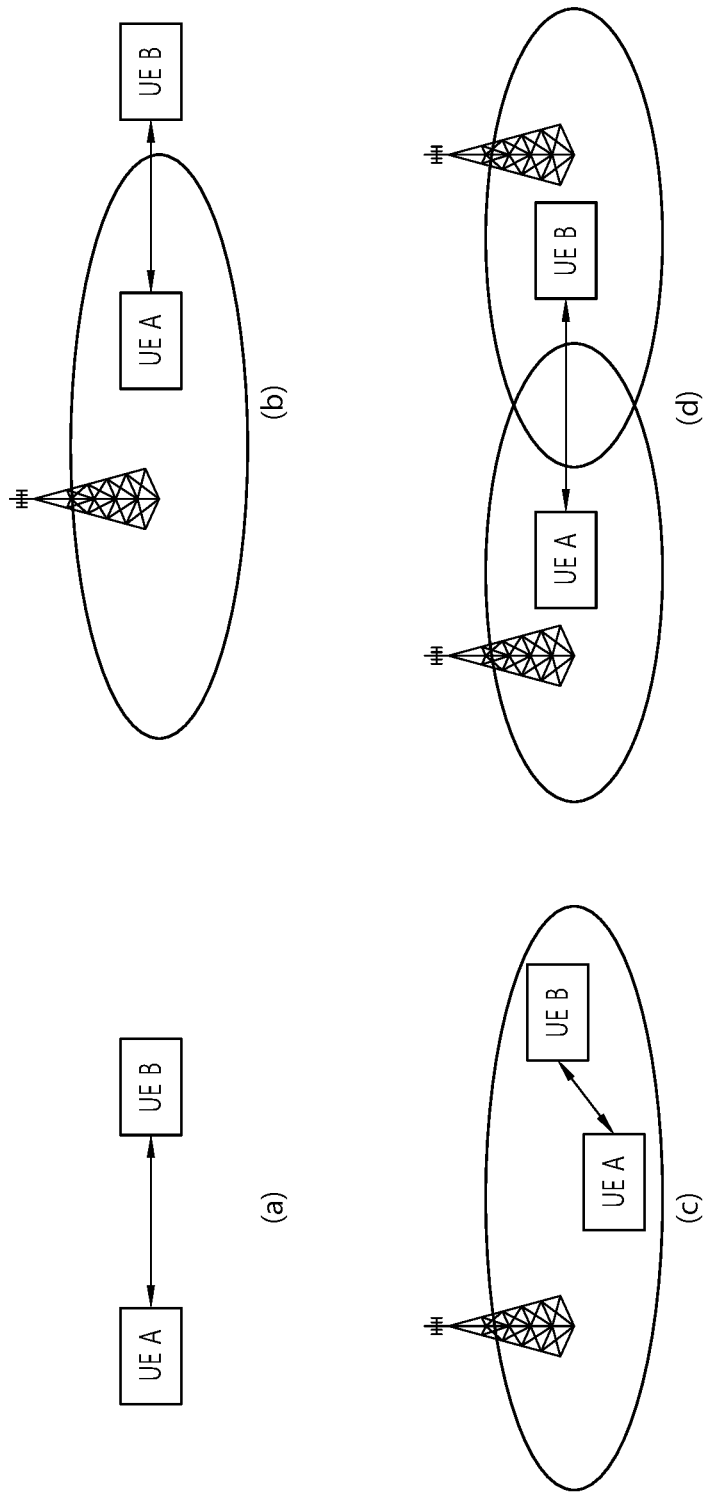
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell. ProSe operation may be performed between types of UE placed at various positions as in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 6:
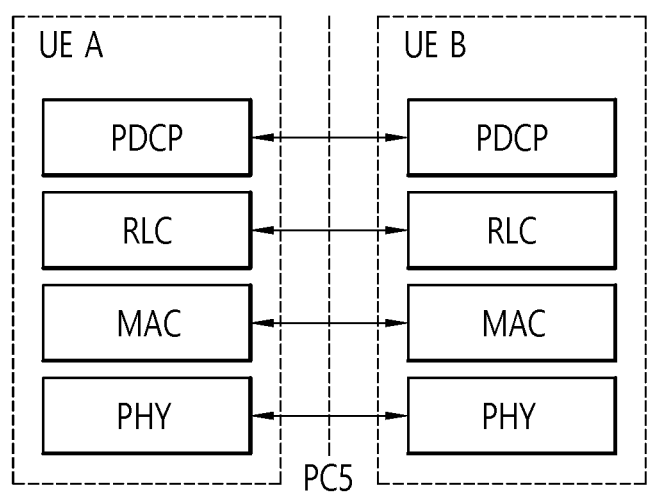
FIG. 6 illustrates a user plane protocol stack for ProSe direct communication.

FIG. 6 illustrates a user plane protocol stack for ProSe direct communication.

Referring to FIG. 6, a PC 5 interface may include PDCH, RLC, MAC, and PHY layers.

In ProSe direct communication, there may be no HARQ feedback. An MAC header may include a source layer-2 ID and a destination layer-2 ID.

Figure 7:
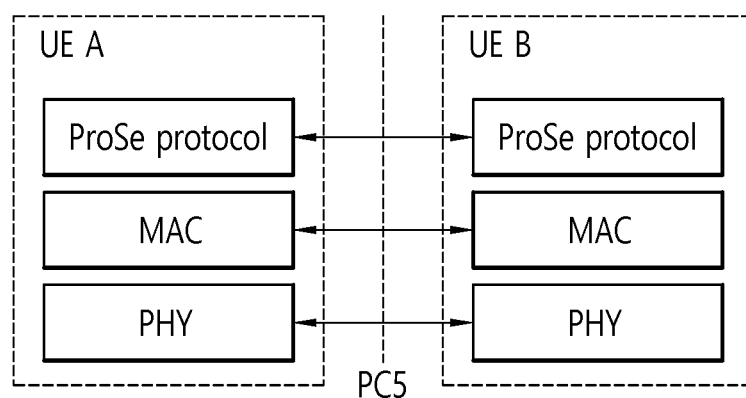
FIG. 7 illustrates a PC 5 interface for D2D discovery.

FIG. 7 illustrates a PC 5 interface for D2D discovery.

Referring to FIG. 7, the PC 5 interface includes an MAC layer, a PHY layer, and a ProSe protocol layer as an upper layer. The upper (ProSe protocol) layer deals with permission for announcement and monitoring of discovery information, and the content of the discovery information is transparent to an access stratum (AS). The ProSe protocol layer allows only valid discovery information to be transmitted to the AS for announcement.

The MAC layer receives discovery information from the upper (ProSe protocol) layer. An IP layer is not used for transmission of discovery information. The MAC layer determines a resource used to announce the discovery information received from the upper layer. The MAC layer creates an MAC protocol data unit (PDU) carrying discovery information and transmits the MAC PDU to the PHY layer. No MAC header is added.

The aforementioned D2D operation may also be applied to vehicle-to-everything (V2X). Hereinafter, a direct link between UEs may be referred to as a sidelink.

The present invention will be described hereinafter.

Schemes to be proposed below relate to methods for performing efficient mutual communication and for reducing interference in a wireless communication system where a first UE operating according to a first radio access technology (RAT) and a second UE operating according to a second RAT coexist. The second UE may support both the first RAT and the second RAT. Alternatively, the second UE may basically operate according to the second RAT and may support both the first RAT and the second RAT for a specific signal. For example, the second UE may operate according to the second RAT for transmission of a control channel, such as a PSCCH and a PSSCH, and a data channel and may support both the first RAT and the second RAT for transmission of a specific signal, such as SLSS and PSBCH signals.

The first RAT may be, for example, a vehicle-to-vehicle (V2V) communication scheme based on existing LTE/LTE-A. The second RAT may be a V2V communication scheme based on a new radio access technology (new RAT). The first RAT may be a radio access technology operating in a first frequency band, and the second RAT may be a radio access technology operating in a second frequency band. Here, the second frequency band may include the first frequency band. The first RAT and the second RAT may be different from each other in at least one of subcarrier spacing, transmission time interval (TTI), frame structure, used waveform, multiple access scheme, channel coding, and reference signal structure.

That is, an example of the present invention provides a method for enabling V2V communication based on the new RAT (referred to as NR_V2V communication) and V2V communication based on existing LTE/LTE-A (referred to as LTE_V2V communication) to efficiently coexist on a particular carrier that is predefined or signaled.

The proposed schemes of the present invention may also be extended to coexistence/interference control of NR_V2X communication and LTE_V2X communication on a particular carrier. V2X refers to vehicle-to-everything. The particular carrier may be referred to as 'V2V dedicated carrier' hereinafter.

LTE_V2V communication may be a technology that operates according to the LTE/LTE-A standard and may operate in a cellular band currently used by a mobile communication system. On the other hand, the new RAT is a new technology developed for a frequency band to be newly allocated. The new RAT may operate in a high-frequency band (e.g., 10 GHz or higher) in order to obtain high capacity, but some functions thereof may be applicable in an existing low-frequency band. For example, for a next-generation (e.g., fifth-generation) radio access technology, interworking/combination of LTE_V2V communication and NR_V2V communication may be an important feature.

Hereinafter, a UE may be a UE mounted on a vehicle.

[Proposed method #1] A configuration may be established to share (at least) a sidelink synchronization signal (SLSS) and/or a physical sidelink broadcast channel (PSBCH) between NR_V2V communication and LTE_V2V communication. The SLSS may be interpreted as at least one of a primary sidelink synchronization signal (PSSS) and a secondary sidelink synchronization signal (SSSS).

Figure 8:
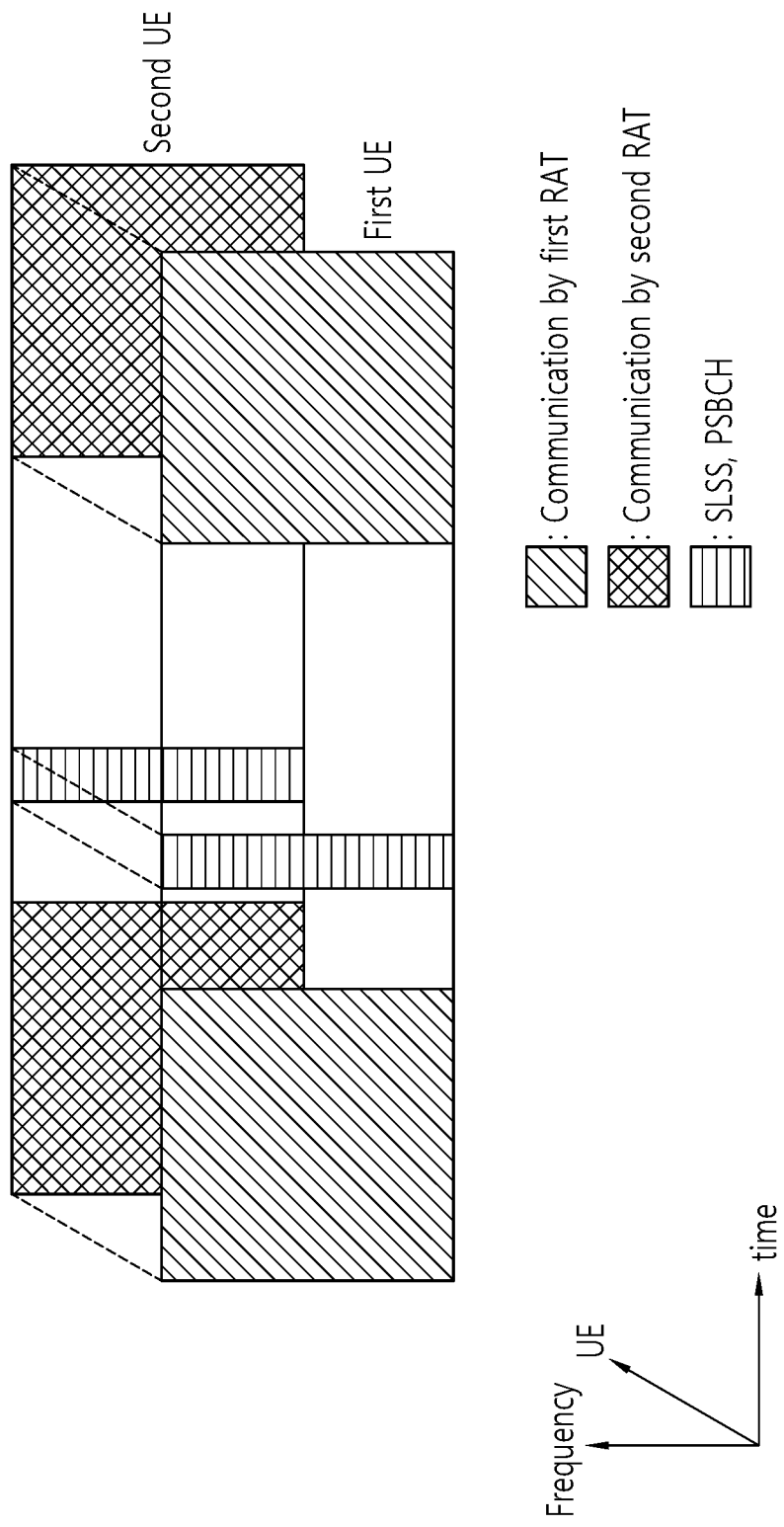
FIG. 8 illustrates proposed method #1.

FIG. 8 illustrates proposed method #1.

Referring to FIG. 8, a first UE may be a UE operating by a first RAT (e.g., LTE), and the second UE may be a UE operating by a second RAT (new RAT).

The second UE basically performs communication by the second RAT but may transmit an SLSS and a PSBCH in the same scheme/format as the first RAT. Thus, the first UE can detect/decode an SLSS/PSBCH transmitted by the second UE.

In proposed method #1, 'sharing' may be implemented by various methods. That is, 'sharing' may be implemented (A) when a UE operating by NR_V2V (NR_V2V UE) has the capability to detect/decode an SLSS and/or PSBCH based on an existing LTE communication format transmitted by a UE operating by LTE_V2V (LTE_V2V UE). Further/alternatively, 'sharing' may be implemented (B) when the NR_V2V UE has the capability to transmit an SLSS and/or PSBCH based on an (existing) LTE communication format that can be detected/decoded by the LTE_V2V UE. Alternatively, 'sharing' may be implemented (C) when the LTE_V2V UE has the capability to detect/decode an SLSS and/or PSBCH based on an NR communication format transmitted by the NR_V2V UE and/or (D) when the LTE_V2V UE has the capability to transmit an SLSS and/or PSBCH based on an NR communication format that can be detected/decoded by the NR_V2V UE.

That is, to implement 'sharing', the first UE operating by existing LTE and the second UE operating by the new RAT are required to have the capability to mutually detect/decode at least essential signals including an SLSS and a PSBCH, and at least one method among (A), (B), (C), and (D) may be used.

The term 'format' may be interpreted as at least one of subcarrier spacing, a frame or subframe structure, a waveform, a multiple access scheme, channel coding, and a reference signal structure.

For example, when at least an SLSS (and/or PSBCH) is shared between NR_V2V communication and LTE_V2V communication, (A) the range of SLSS ID values (e.g., 0 to 335) and/or (B) a 'Zadoff-Chu root sequence index (U) value used for generating a PSSS sequence per SLSS ID (e.g., when SLSS ID≤167, U=37; and when SLSS ID>167, U=26) and/or (C) a subframe index (e.g., subframe #0) assumed for generating an SSSS sequence and/or (D) an SLSS ID set belonging to ID_NET/ID_OON, (e.g., {0, 1, . . . , 167}' belongs to ID_NET, and {168, 169, . . . , 335} belongs to ID_OON) may be commonly assumed.

Figure 9:
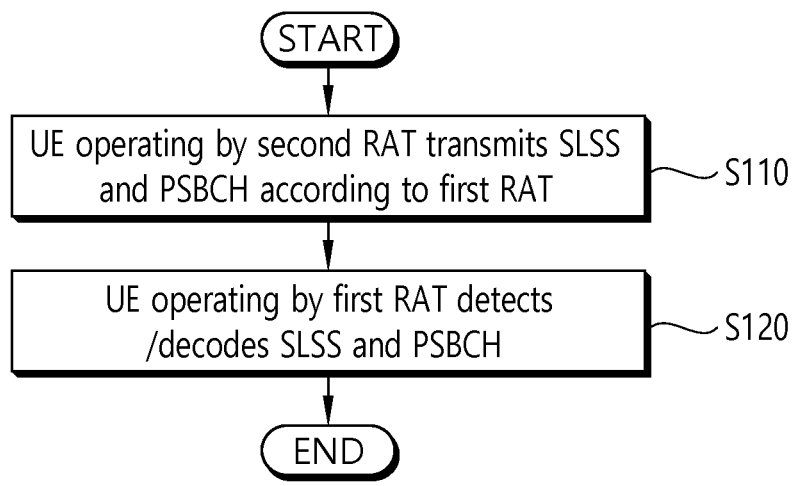
FIG. 9 illustrates a signal transmission method of a UE according to proposed method #1.

FIG. 9 illustrates a signal transmission method of a UE according to proposed method #1.

Referring to FIG. 9, a UE operating by a second RAT transmits an SLSS and a PSBCH according to a first RAT (S110).

A UE operating by the first RAT detects/decodes the SLSS and PSBCH (S120).

When proposed method #1 is applied, an NR_V2V UE (hereinafter, second UE) and an LTE_V2V UE (hereinafter, first UE) can detect/decode (at least) an SLSS and/or PSBCH transmitted from each other, thus efficiently distinguishing/maintaining an NR_V2V communication-related resource pool and an LTE-V2V communication-related resource pool in a time division multiplexing (TDM) form configured (signaled) by a network.

Further, (when proposed method #1 is applied) the NR_V2V UE may be configured to transmit NR_V2V communication-related resource pool information (in addition to an NR_V2V communication-related bandwidth and/or an NR_V2V communication-related subframe number) on a PSBCH.

Alternatively, the LTE_V2V UE may be configured to transmit LTE_V2V communication-related resource pool information (in addition to an LTE_V2V communication-related bandwidth and/or an LTE_V2V communication-related subframe number) on a PSBCH.

When these rules are applied, for efficient coexistence, the LTE_V2V UE, which has recognized the NR_V2V communication-related resource pool information, may be configured not to perform an LTE_V2V message transmission operation on the NR_V2V communication-related resource pool.

Figure 10:
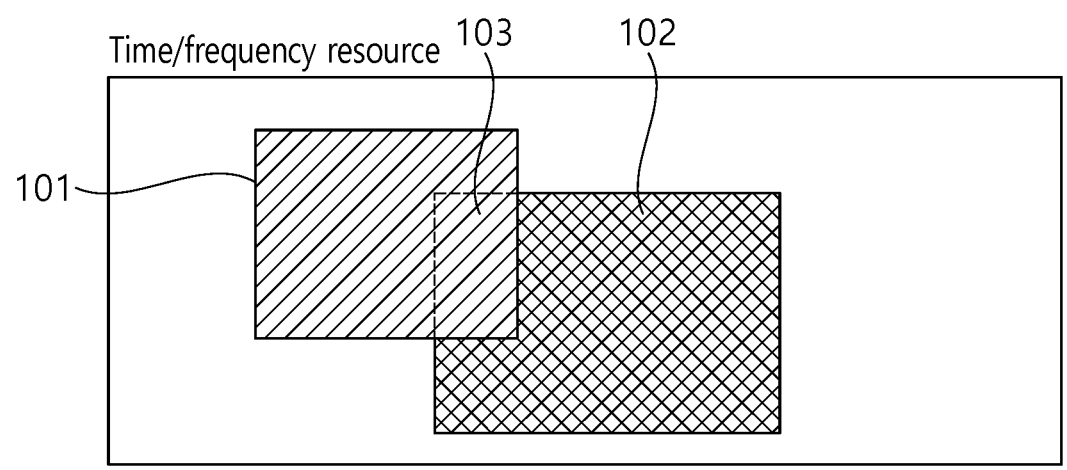
FIG. 10 illustrates a case where an NR_V2V communication-related resource pool and an LTE_V2V communication-related resource pool overlap.

FIG. 10 illustrates a case where an NR_V2V communication-related resource pool and an LTE_V2V communication-related resource pool overlap.

Referring to FIG. 10, an NR_V2V communication-related resource pool 101 and an LTE_V2V communication-related resource pool 102 may partially overlap in an area 103.

In this case, when selecting an LTE_V2V message transmission resource, an LTE_V2V UE may select a transmission resource from the LTE_V2V communication-related resource pool 102 except for a resource 103 that overlaps with a resource in the NR_V2V communication-related resource pool 101.

Alternatively, when performing an LTE_V2V message transmission operation on the NR_V2V communication-related resource pool, the LTE_V2V UE may be configured to reduce transmission power by a preset or signaled offset value (which is referred to as a power deboosting offset).

Alternatively, an NR_V2V UE, which has recognized LTE_V2V communication-related resource pool information, may be configured not to perform an NR_V2V message transmission operation on the LTE_V2V communication-related resource pool. For example, when selecting an NR_V2V message transmission resource, the NR_V2V UE may select a transmission resource from the NR_V2V communication-related resource pool except for a resource that overlaps with a resource in the LTE_V2V communication-related resource pool. Alternatively, when performing an NR_V2V message transmission operation on the LTE_V2V communication-related resource pool, the NR_V2V UE may be configured to reduce transmission power by a preset or signaled offset value.

When the NR_V2V communication-related resource pool and the LTE_V2V communication-related resource pool partly or entirely overlap, it may be configured or signaled which resource pool or which related communication has a high priority.

[Proposed method #2] When proposed method #1 described above is applied, NR_V2V communication and LTE_V2V communication may be distinguished by at least one of the following illustrated rules.

Example #2-1

An NR_V2V communication-related resource pool and an LTE_V2V communication-related resource pool may be configured/separated in a TDM form (and/or frequency division multiplexing (FDM) form).

When this rule is applied, an individual communication-related format may be (independently) applied to remaining channels/signals (e.g., a physical sidelink control channel (PSCCH) and a physical sidelink shared channel (PSSCH)) other than a channel/signal (e.g., SLSS and PSBCH) shared between NR_V2V communication and LTE_V2V communication.

Example #2-2

NR_V2V communication and LTE_V2V communication may be separated by differently setting at least one of the following parameters regarding a predefined channel/signal.

When at least one of (at least) subcarrier spacing, a (sub)frame structure, a waveform, a multiple access scheme, and channel coding is different between NR_V2V communication and LTE_V2V communication, (some of) the following parameters may be set to be the same.

i) A seed value (referred to as C_INIT) used to initialize a scrambling sequence generator. For example, a C_INIT value for an NR_V2X communication-related PSCCH (/PSSCH/PSBCH) may be set to a value other than 510.

ii) A cyclic shift value (and/or an orthogonal cover code (OCC) sequence) associated with a reference signal (e.g., demodulation reference signal (DM-RS)). Here, for example, a cyclic shift value for an NR_V2X communication-related PSCCH (/PSSCH/PSBCH) may be set to a value other than 0 (and/or [+1 +1]).

Example #2-3

Synchronization resources may be separated between the NR_V2V communication and the LTE_V2V communication. It is assumed that an NR_V2V synchronization signal has a plurality of predefined or signaled formats. In this case, a configuration may be established such that an LTE_V2V synchronization signal is transmitted (through an LTE_V2V synchronization resource) when the LTE_V2V synchronization signal is detected and a new-format NR_V2V synchronization signal is transmitted through a separated (NR_V2V) synchronization resource otherwise.

Example #2-4

An SLSS may be shared between NR_V2V communication and LTE_V2V communication, whereas PSBCH transmission resources may be separated in an FDM form.

For example, an NR_V2V communication-related PSBCH transmission resource is set to a position (size) other than that of six center RBs (in a system band) where an LTE_V2V communication-related PSBCH is transmitted, thereby reducing interference mutually affected by an NR_V2V PSBCH and an LTE_V2V PSBCH, which are in different formats.

[Proposed method #3] When proposed method #1 described above is applied, an NR_V2V UE performing NR_V2V communication (A) may receive (from a network) an indication/configuration of the possibility that an LTE_V2V UE performing LTE_V2V communication exists (and/or the possibility that LTE_V2V communication is to be performed) on the same carrier (even though an NR_V2V communication-related format is different) and/or (B) may be configured to transmit an SLSS (and/or PSBCH) in an LTE_V2V communication-related format when an LTE_V2V UE performing LTE_V2V communication (and/or LTE_V2V communication) is detected.

Figure 11:
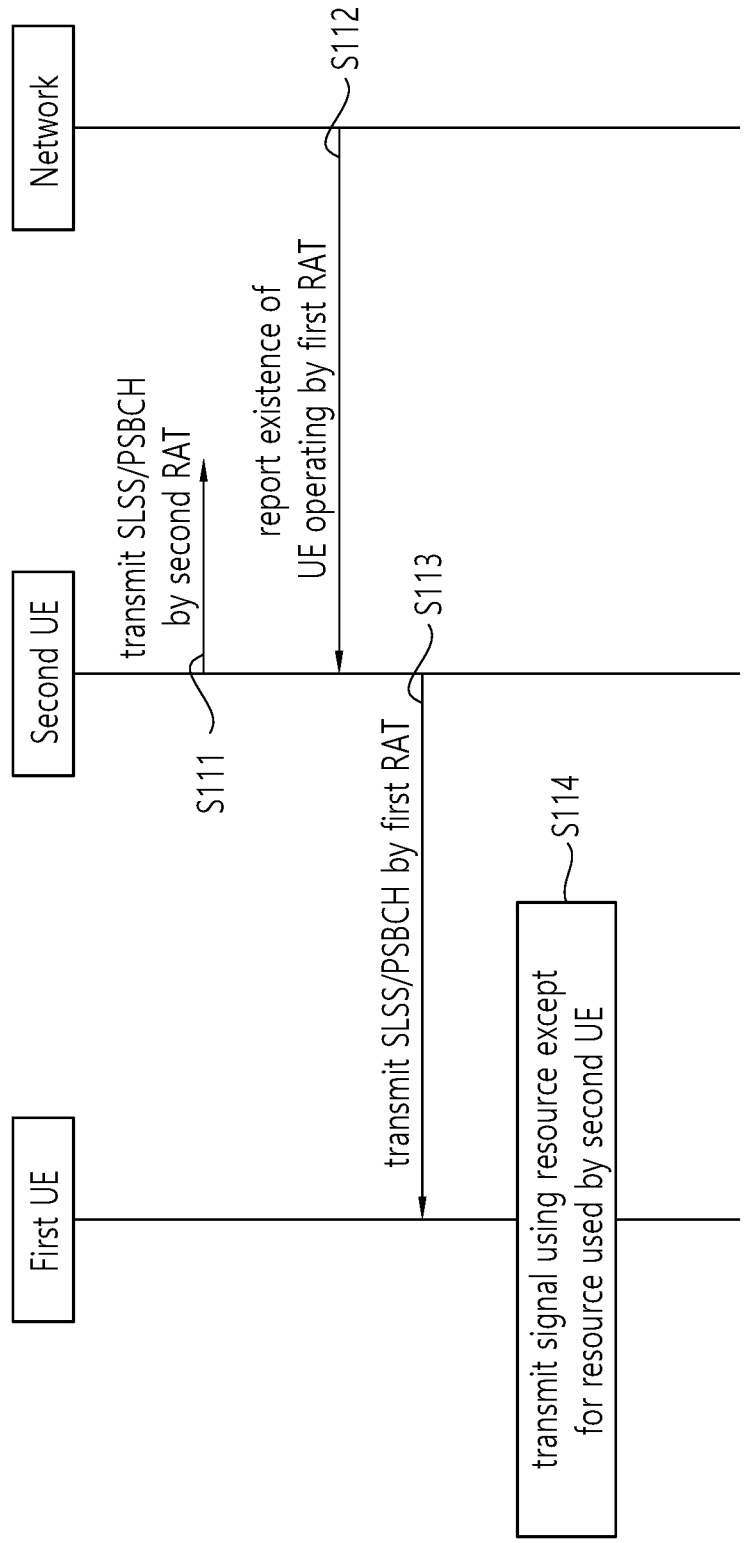
FIG. 11 illustrates an example of applying proposed method #3.

FIG. 11 illustrates an example of applying proposed method #3.

Referring to FIG. 11, a second UE transmits an SLSS/PSBCH by a second RAT (NR) on a carrier (S111).

A network may provide, to the second UE, information indicating that there is a UE operating by a first RAT on the carrier (or LTE_V2V communication is likely to be performed) (S112).

The second UE transmits an SLSS/PSBCH by the first RAT (S113). As described above, the PSBCH may include at least one of a second RAT communication (e.g., NR_V2V)-related bandwidth, a second RAT communication (e.g., NR_V2V)-related subframe number, and second RAT communication (e.g., NR_V2V)-related resource pool information.

Since the first UE can detect/decode the SLSS/PSBCH by the first RAT, the first UE can know a resource used by the second UE using the second RAT communication (e.g., NR_V2V)-related bandwidth, the second RAT communication (e.g., NR_V2V)-related subframe number, and the second RAT communication (e.g., NR_V2V)-related resource pool information included in the PSBCH. The first UE may transmit a signal (V2V signal using a resource except for the resource used by the second UE (S114). Therefore, it is possible to reduce the possibility of a resource collision between the first and second UEs using different RATs and reduce interference.

The second UE may transmit the SLSS and the PSBCH signal by the first RAT only when it is determined that there is another UE by the first RAT on a particular carrier according to the information provided by the network.

The network may directly recognize information on whether (possibility) an LTE_V2V UE performing LTE_V2V communication exists (and/or information on whether (possibility) LTE_V2V communication is performed) on the same carrier through a predefined detection (/sensing) operation, or may indirectly recognize this information through a sensing (/detection) result reported from an NR_V2V UE (or information on whether LTE_V2V communication is performed (on the same carrier) reported from an LTE_V2V UE).

[Proposed method #4] When (some of) the aforementioned proposed methods (e.g., proposed method #1, proposed method #2, and proposed method #3) are applied, synchronization may be shared between NR_V2V communication and LTE_V2V communication. However, when the length of a TTI is different, a configuration may be established such that an NR_V2V (sub)frame number is further derived (/induced) from an LTE_V2V (sub)frame number derived (/induced) from LTE_V2V synchronization (/PSBCH) (through a predefined (/signaled) rule).

Figure 12:
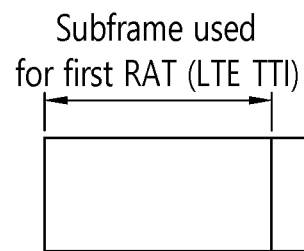
FIG. 12 illustrates an example of TTIs used for LTE_V2V communication (communication by a first RAT) and NR_V2V communication (communication by a second RAT).
Figure 12:
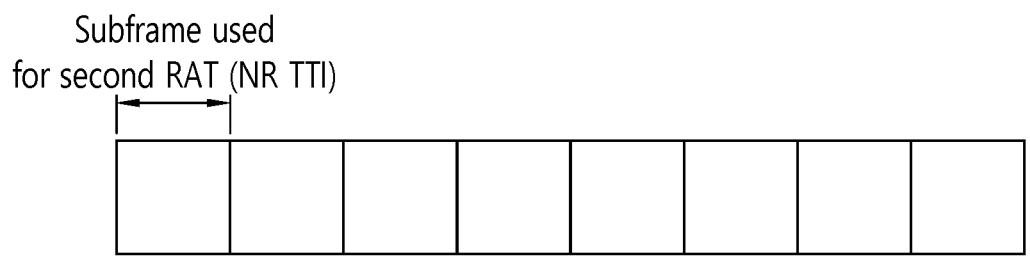

FIG. 12 illustrates an example of TTIs used for LTE_V2V communication (communication by a first RAT) and NR_V2V communication (communication by a second RAT).

Referring to FIG. 12, a subframe (LTE TTI) used in the first RAT may be 1 ms, and a subframe (NR TTI) used in the second RAT may be 0.5 ms.

When the NR TTI and the LTE TTI are 0.5 ms and 1 ms, respectively, the first half of an LTE_V2V (sub)frame # X may be considered as an NR_V2V (sub)frame #(2X), and the second half may be considered as an LTE_V2V (sub)frame #(2X+1).

For example, an LTE communication-based base station may control (/schedule) NR SL communication (e.g., resource pool (pre)configuration and mode-1 resource allocation), or (on the contrary) an NR communication-based base station may control (/schedule) LTE SL communication. In addition, for example, when direct short-range communication (DSRC) detects an LTE SLSS (/PSBCH) or the SLSS (/PSBCH) includes (relevant) service (/RAT) (type/kind) information (and/or information (e.g., pieces of numerology information, such as subcarrier spacing and a waveform) on SL communication (e.g., PSCCH/PSSCH) performed based on the SLSS (/PSBCH) (synchronization), an NR SLSS may be limited (/configured/signaled) to be used in the same form as an LTE SLSS.

Since the examples of the proposed methods described above may also be included as methods for implementing the present invention, it is obvious that these examples may be considered as a kind of proposed methods. The proposed methods described above may be implemented independently but may also be implemented by combining (or merging) some of the proposed methods. Although the proposed methods of the present invention have been described based on a 3GPP LTE system for the convenience of explanation, the proposed methods can be extensively applied to systems other than the 3GPP LTE system. For example, the proposed methods of the present invention can be applied to D2D communication. D2D communication may means that a UE directly communicates with another UE using a wireless channel. A UE refers to a terminal of a user but may also refer to network equipment, such as a base station, which transmits/receives a signal according to a communication mode between UEs. The proposed methods of the present invention may be applied only to a mode-2 V2X operation (and/or a mode-1 V2X operation).

Figure 13:
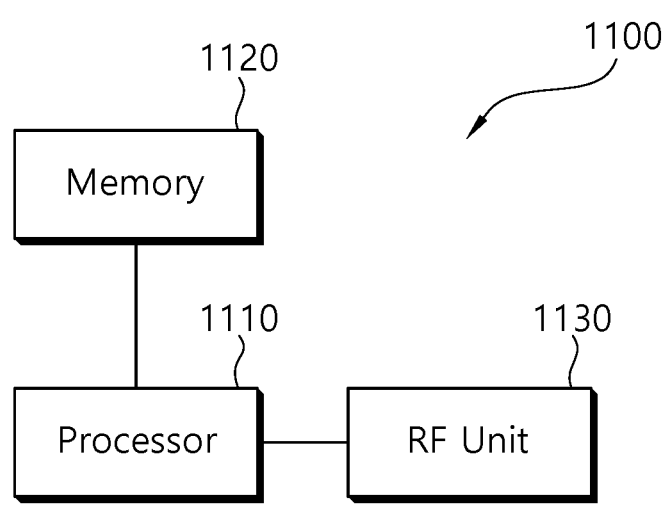
FIG. 13 is a block diagram illustrating a device to implement an embodiment of the present invention.

FIG. 13 is a block diagram illustrating a device to implement an embodiment of the present invention.

Referring to FIG. 13, the device 1100 includes a processor 1110, a memory 1120, and a radio frequency (RF) unit 1130.

According to one embodiment, the processor 1110 may implement the functions/operations/methods illustrated in the present invention. For example, the processor 1110 may transmit a second signal according to a second RAT and may transmit a first signal according to first RAT. Here, the first signal may include at least one of a sidelink synchronization signal (SLSS) and a physical sidelink broadcast channel (PSBCH) signal.

The RF unit 1130 is connected to the processor 1110 to transmit and receive radio signals.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for transmitting a first 'vehicle-to-everything' (V2X) signal in a wireless communication system, the method performed by a second user equipment (UE) and comprising:
    transmitting a second V2X signal for a second radio access technology (RAT), wherein the second UE supports the second RAT; and
    transmitting, to a first UE, the first V2X signal for a first RAT, wherein the first UE supports the first RAT and does not support the second RAT,
    wherein the second UE transmits the second V2X signal on a second resource pool different from a first resource pool,
    wherein the second resource pool is a resource pool for the second RAT, and the first resource pool is a resource pool for the first RAT,
    wherein the second resource pool has a region overlapping with the first resource pool on a time and frequency domain,
    wherein the first V2X signal, which is transmitted by the second UE supporting the second RAT, comprises at least one of a sidelink synchronization signal (SLSS) or a physical sidelink broadcast channel (PSBCH) signal, and
    wherein the at least one of the SLSS or the PSBCH signal is a signal supported to be decoded based on the first UE supporting the first RAT.

2. The method of claim 1, wherein the first RAT is a new RAT (NR), and the second RAT is a long term evolution (LTE) or a LTE advanced.

3. The method of claim 1, wherein the first RAT and the second RAT are different from each other in at least one of subcarrier spacing, transmission time interval (TTI), frame structure, used waveform, multiple access scheme, channel coding, or reference signal structure.

4. The method of claim 1, wherein the PSBCH signal comprises information informing a resource used by the second UE for V2X communication.

5. The method of claim 1, further comprising:
    receiving, from a network, information informing whether there is another UE operating by the first RAT on a particular carrier.

6. The method of claim 5, wherein the at least one of the SLSS or the PSBCH signal is transmitted based on the other UE being on the particular carrier.

7. The method of claim 1, wherein a transmission time interval (TTI) for the first RAT is twice as long as a TTI for the second RAT.

8. The method of claim 1, wherein the second UE supports both the first RAT and the second RAT.

9. A second user equipment (UE) configured to transmit a first vehicle to X (V2X) signal, the second UE comprising:
    a transceiver;
    at least one processor; and
    at least one computer memory operably connectable to the at least one processor and storing instructions that, based on being executed by the at least one processor, perform operations comprising:
    transmitting, through the transceiver, a second V2X signal for a second radio access technology (RAT), wherein the second UE supports the second RAT; and
    transmitting, to a first UE through the transceiver, the first V2X signal for a first RAT, wherein the first UE supports the first RAT and does not support the second RAT,
    wherein the second UE transmits the second V2X signal on a second resource pool different from a first resource pool,
    wherein the second resource pool is a resource pool for the second RAT, and the first resource pool is a resource pool for the first RAT,
    wherein the second resource pool has a region overlapping with the first resource pool on a time and frequency domain,
    wherein the first V2X signal, which is transmitted by the second UE supporting the second RAT, includes at least one of a sidelink synchronization signal (SLSS) or a physical sidelink broadcast channel (PSBCH) signal, and
    wherein the at least one of the SLSS or the PSBCH signal is a signal supported to be decoded based on the first UE supporting the first RAT.

* * * * *